United States Patent
Zhang et al.

(10) Patent No.: US 8,938,332 B1
(45) Date of Patent: Jan. 20, 2015

(54) STARTUP CONTROL OF DEVICES

(71) Applicant: Cisco Technology, Inc., San Jose, CA (US)

(72) Inventors: Tao Zhang, Fort Lee, NJ (US); Ashok K Moghe, Pleasanton, CA (US); Aaron A Lung, San Jose, CA (US); Min He, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 14/024,080

(22) Filed: Sep. 11, 2013

(51) Int. Cl.
 *G06F 7/00* (2006.01)
 *B60W 10/30* (2006.01)
 *B60W 50/08* (2012.01)

(52) U.S. Cl.
 CPC ............... *B60W 10/30* (2013.01); *B60W 50/08* (2013.01)
 USPC ........................................................ 701/36

(58) Field of Classification Search
 USPC ............................................. 701/36, 99, 123
 See application file for complete search history.

(56) References Cited

U.S. PATENT DOCUMENTS

2009/0082909 A1 * 3/2009 Sakane .................... 700/293
2012/0215396 A1 * 8/2012 Hamilton et al. ........... 701/29.1

* cited by examiner

*Primary Examiner* — Kim T Nguyen
(74) *Attorney, Agent, or Firm* — Tucker Ellis LLP

(57) ABSTRACT

Controlled startup of devices is based on dynamic statistical predictions. Timely startup of onboard associated vehicle devices is based on dynamic statistical predictions and driver proximity to the vehicle. An apparatus for timely startup includes an interface operatively coupled with a power consuming device and control logic coupled with the interface. The control logic is operable in a first mode to perform processing for determining a presence of a first condition of the vehicle, and to selectively activate the power consuming device of the vehicle, via the interface, responsive to determining the presence of the first condition. The control logic is operable in a second mode to suspend, via the interface, the processing for determining the presence of the first condition of the vehicle. The control logic selectively transitions between the first and second modes in accordance with a stochastic modeling of the presence of the first condition over time.

21 Claims, 11 Drawing Sheets

STARTUP CONTROL OF DEVICES

TECHNICAL FIELD

The present disclosure relates generally to timely startup control of devices relative to anticipated need for use of the devices.

BACKGROUND

Motor vehicles are increasingly equipped with electronic devices that have sophisticated software applications which need to boot up and become functional in a timely manner to satisfy instant-on experience expectations and to satisfy stringent vehicle communication and control performance requirements. Such electronic devices include in-vehicle infotainment, navigation, telematics, onboard communication gateways, vehicle safety communication and control systems and the like.

There may be insufficient time for a device and all its software and application modules to become fully functional before the vehicle or its driver expect to use the functions provided by the device. Consequently, many functions, which rely on sophisticated software, cannot become fully functional in a timely manner and ultimately result in driver dissatisfaction.

As software in automotive electronic devices becomes more complex, boot up times typically increase accordingly. Shortening just the software startup time alone may be insufficient to ensure that a device can become fully functional in a timely manner. Detection of remote driver door unlock and/or physical door opening events provides mere blind startup control of devices and thereby may consume battery power needlessly if the driver has no intention of ever using the device or never intends to start the engine of the vehicle. Some proposed schemes draw continuous power and thereby unnecessarily deplete the main battery.

BRIEF DESCRIPTION OF THE DRAWINGS

The accompanying drawings incorporated herein and forming a part of the specification illustrate the example embodiments.

DESCRIPTION OF EXAMPLE EMBODIMENTS

Overview

Figure 1:
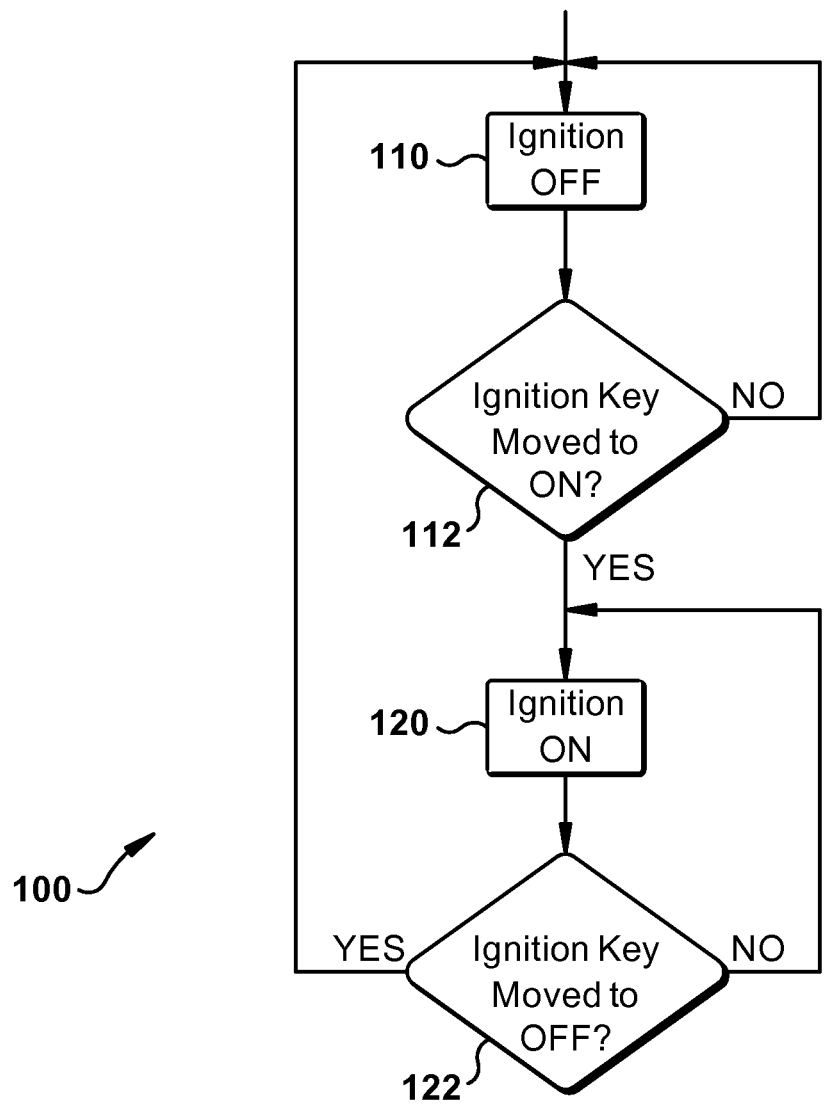
FIG. 1 is a flowchart of basic operating states of an associated motor vehicle and conditions for transitions between the states.

The following presents a simplified overview of the example embodiments in order to provide a basic understanding of some aspects of the example embodiments. This overview is not an extensive overview of the example embodiments. It is intended to neither identify key or critical elements of the example embodiments nor delineate the scope of the appended claims. Its sole purpose is to present some concepts of the example embodiments in a simplified form as a prelude to the more detailed description that is presented later.

In accordance with embodiments herein, one or more devices and software supporting the one or more devices are timely initiated from an off or sleep mode or condition and thereby allowed to boot up and become fully functional prior to an anticipated need for use of the devices. In the example embodiment, one or more onboard vehicle devices and software supporting the one or more onboard vehicle devices are timely initiated from an off or sleep mode or condition and thereby allowed to boot up and become fully functional prior to a driver enters the vehicle. Overall battery power consumption by the device while the vehicle is in an ignition-off state is also minimized.

In accordance with an example embodiment, there are disclosed herein techniques wherein selected components of an associated motor vehicle are initiated or activated in a timely manner relative to their expected use and/or need.

In accordance with an example embodiment, there is disclosed herein an apparatus comprising an interface operatively coupled with a power consuming device of an associated motor vehicle, and control logic coupled with the interface. The control logic is operable in a plurality of modes comprising at least a first mode and a second mode. The control logic is operable in the first mode to perform processing for determining a presence of a first condition of the associated motor vehicle. The control logic is operable in the first mode to selectively activate the power consuming device of the associated motor vehicle, via the interface, responsive to determining the presence of the first condition. The control logic is operable in the second mode to suspend, via the interface, the processing for determining the presence of the first condition of the associated motor vehicle. The control logic selectively transitions between the first and second modes in accordance with a stochastic modeling of the presence of the first condition over time.

In accordance with a further example embodiment, there is disclosed herein a method comprising operating control logic in a plurality of modes comprising at least a first mode and a second mode; performing processing by the control logic operating in the first mode for determining a presence of a first condition of an associated motor vehicle; selectively activating by the control logic operating in the first mode a power consuming device of the associated motor vehicle, via an interface coupled with the control logic and operatively coupled with the power consuming device, responsive to determining by the control logic the presence of the first condition; suspending by the control logic operating in the second mode the processing for determining the presence of the first condition of the associated motor vehicle; and selectively transitioning the control logic between the first and second modes in accordance with a stochastic modeling of the presence of the first condition over time.

In accordance with yet a further example embodiment, there is disclosed herein logic encoded in one or more tangible non-transient computer-readable media for execution by a processor and when executed by the processor the logic being operable to operate control logic in a plurality of modes comprising at least a first mode and a second mode; perform processing by the control logic operating in the first mode for determining a presence of a first condition of an associated motor vehicle; selectively activate by the control logic operating in the first mode a power consuming device of the associated motor vehicle, via an interface coupled with the control logic and operatively coupled with the power consuming device, responsive to determining by the control logic the presence of the first condition; suspend by the control logic operating in the second mode the processing for determining the presence of the first condition of the associated motor vehicle; and selectively transition the control logic between the first and second modes in accordance with a stochastic modeling of the presence of the first condition over time.

DETAILED DESCRIPTION OF EXAMPLE EMBODIMENTS

This description provides examples not intended to limit the scope of the appended claims. The figures generally indicate the features of the examples, where it is understood and appreciated that like reference numerals are used to refer to like elements. Reference in the specification to "one embodiment" or "an embodiment" or "an example embodiment" means that a particular feature, structure, or characteristic described is included in at least one embodiment described herein and does not imply that the feature, structure, or characteristic is present in all embodiments described herein.

In general, the embodiments herein provide timely startup control of devices relative to anticipated need for use of the devices. The startup control may include the application and/or removal of power relative to hardware and may include the booting up and/or down of software or other logic. In the example embodiment, the devices are onboard motor vehicle devices. However, it is to be appreciated that the embodiments of the claims herein are not limited in any way to the example embodiments but rather are to be interpreted to cover timely startup of any devices beyond those for vehicles in any application. That is, the embodiments herein can be applied to management of startup and shut-down of electronic systems in homes, offices, factories or anywhere timely wakeup or power management is desired.

In an embodiment, proximity of a driver relative to a motor vehicle is detected and selectively used with other factors to intelligently timely power up and/or down selected devices of the motor vehicle and software and application modules of the devices in accordance with the proximity detection.

An embodiment herein uses one or more statistical models to dynamically predict an anticipated need for use of devices and to control the timely startup of the devices relative to anticipated need for use of the devices thereby ensuring timely boot-up and eliminating or reducing unnecessary or premature power-up of the device and software and application modules of the devices.

A further embodiment herein operates in multiple power modes to balance power savings and the ability to timely start up the one or more devices and their respective software and application modules. Statistical modeling techniques are selectively used to determine when a device, its software, and its application modules should enter into or transition between the power modes and how long to operate in each power mode.

In an embodiment a supervisory power management module may be centralized or distributed and selectively operates in alternate active and power-saving modes, and determines when it should enter into, and how long it should stay in, each of the one or more power-saving modes without jeopardizing its ability to timely start up the devices under its power management.

With reference now to the drawing Figures, wherein the showings are for purposes of illustrating example embodiments only and not for purposes of limiting same, FIG. 1 illustrates a flowchart of a basic operating method 100 of an associated motor vehicle. As shown, the associated motor vehicle enters into one or more basic operating states selectively transitions between the states. In a first mode of the associated motor vehicle, the vehicle is in an ignition OFF state 110. In a second mode 120 of the associated motor vehicle, the vehicle is in an ignition ON state 120. The associated motor vehicle may operate in one or more other additional modes or states as well but for purposes of describing the example embodiments herein, the ignition ON and OFF states are sufficient.

At step 112, the ignition key or equivalent system of the associated motor vehicle is transitioned to an ON position or condition whereby the associated motor vehicle transitions from the ignition OFF state 110 to the ignition ON state 120. Similarly, at step 122, the ignition key or equivalent system of the associated motor vehicle is transitioned to an OFF position or condition whereby the associated motor vehicle transitions from the ignition ON state 120 to the ignition OFF state 110.

In accordance with embodiments herein, signals may be received from the associated motor vehicle indicating the current state of the associated motor vehicle. Alternatively, embodiments herein may query the associated motor vehicle for its current operating state from time to time as appropriate. Yet still further, the embodiments herein may be integrated, more or less, with selected components of the associated motor vehicle to more easily and quickly determine the current operational state of the vehicle in a manner that is transparent to the vehicle.

Figure 2:
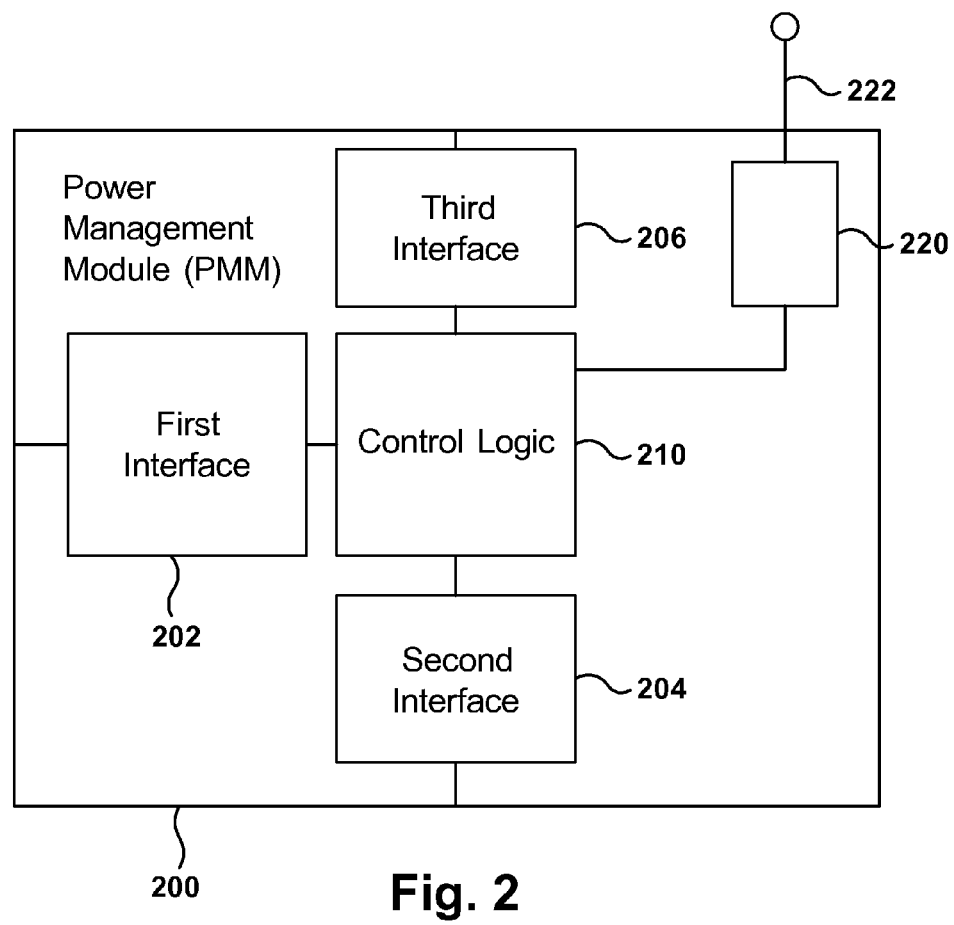
FIG. 2 is a block diagram illustrating a Power Management Module (PMM) operable with components of an associated motor vehicle in accordance with the example embodiment.

FIG. 2 is a block diagram illustrating a Power Management Module (PMM) 200 in accordance with the example embodiment operable with components of an associated motor vehicle. The PMM 200 comprises a first interface 202 coupling the PMM 200 with an associated source of power such as, for example, the battery of the associated motor vehicle, a second interface 204 coupling the PMM 200 with a switch disposed between the battery of the associated motor vehicle and one or more hardware modules of the motor vehicle wherein the switch controls power to be applied to the modules in accordance with signals from the PMM, a third interface 206 coupling the PMM with one or more software and/or application modules of the associated motor vehicle corresponding to the one or more hardware modules, and a transceiver unit 220 including an antenna 222 for selective communication with one or more portable electronic devices of a user of the associated vehicle. The PMM of the example embodiment further comprises control logic 210 coupled with the first, second, and third interfaces, wherein the control logic is operable to receive signals from the associated motor vehicle to discriminate between the ignition ON and ignition OFF states, and to determine transitions therebetween. The control logic is further operable to control the timely startup and intelligent power down of the one or more software and application modules of the associated motor vehicle and to control power selectively applied to the one or more hardware modules of the associated motor vehicle in accordance with embodiments to be described in greater detail below. "Logic" as used herein, includes but is not limited to hardware, firmware, software and/or combinations of each to perform a function(s) or an action(s), and/or to cause a function or action from another component. For example, based on a desired application or need, logic may include a software controlled microprocessor, discrete logic such as an application specific integrated circuit ("ASIC"), system on a chip ("SoC"), programmable system on a chip ("PSoC"), a programmable/programmed logic device, memory device containing instructions, or the like, or combinational logic embodied in hardware. Logic may also be fully embodied as software stored on a non-transitory, tangible medium which performs a described function when executed by a processor. Logic may suitably comprise one or more modules configured to perform one or more functions.

Figure 3:
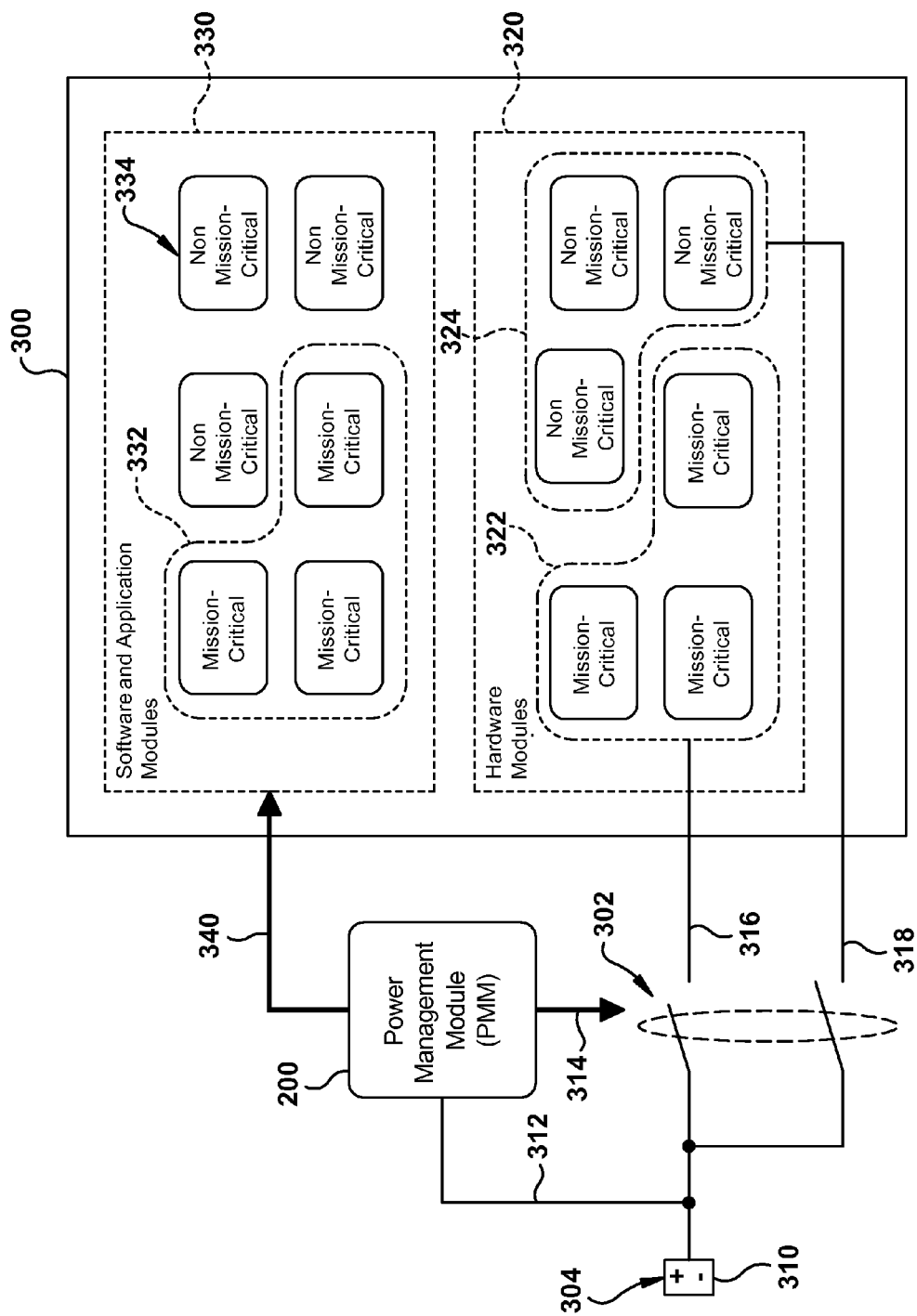
FIG. 3 is a functional block diagram showing the PMM of the example embodiment in use with selected components of an associated motor vehicle.

With reference next to FIG. 3, as noted, in the example embodiment, the PMM 200 manages power up of one or more devices of the associated motor vehicle, and bootup and software startup procedures of the one or more devices as the driver is approaching the associated vehicle from a distance to ensure adequate time is available for the one or more devices to become fully functional. In this disclosure, any electronic device managed by the PMM will be referred to as a "device" and it is to be appreciated that the PMM can manage one or multiple devices. In addition, it is to be appreciated that the PMM can be a separate entity from the device or it may be implemented as an integral module inside the managed device and/or distributed between several managed devices.

FIG. 3 is a functional block diagram showing the PMM 200 of the example embodiment in use with selected components of an associated motor vehicle including in the example a set 300 of devices including hardware modules 320 and software modules 330 corresponding to the hardware modules, a power disconnect unit 302, and a power source 304. The first interface 202 (FIG. 2) couples the PMM 200 with an associated source of power such as, for example, the battery 310 of the associated motor vehicle via a power feed connection 312. The second interface 204 (FIG. 2) couples the PMM 200 via a power switch control signal line 314 with the power disconnect unit 302 disposed between the battery 310 of the associated motor vehicle and the set 300 of one or more hardware modules 320 of the motor vehicle wherein the power disconnect unit 302 is operable as an electrical switch to control the application of power to the set 300 of modules of the vehicle in accordance with signals from the PMM.

In the illustrated embodiment, the power from the battery 310 is delivered to the hardware modules 320 by a pair of power delivery lines 316, 318 whereby power may be delivered to the device hardware modules 320 which are grouped into mission-critical hardware modules 322 and non-mission-critical modules hardware modules 324. The power to the mission-critical modules and the non-mission-critical modules is controlled by separate switches on the power supply line. Similarly, the software and application modules 330 of the set 300 of devices are grouped into mission-critical software modules 332 and non-mission-critical modules software modules 334 in a way that mission-critical software modules can be started before and/or separately from non-mission-critical software modules as maybe necessary or desired. Along those lines, startup control of the software modules 330 is delivered from the PMM 200 using the third interface 206 (FIG. 2) via a set of startup control signal lines 340.

As will be described, mission critical hardware and software modules 322, 332 can be switched on and started immediately upon the driver being detected to be inside a predetermined activation range relative to the associated motor vehicle. The non-mission-critical modules 324, 334 can be powered on and started at a later time in response to additional triggering events indicating that the driver will use the vehicle imminently. These triggers may include, for example, the driver door being unlocked or opened, or the ignition is being turned on for example.

The PMM of the example embodiment includes control logic 210 for implementing a power management policy that is used in the example embodiment to govern when the hardware and software modules should be booted up and down. This policy can be updated over the air by an Internet server or a server in the cloud for example. The cloud-based server can use information aggregated from multiple vehicles to optimize the power management policy and then update the policies onboard each vehicle.

Figure 4:
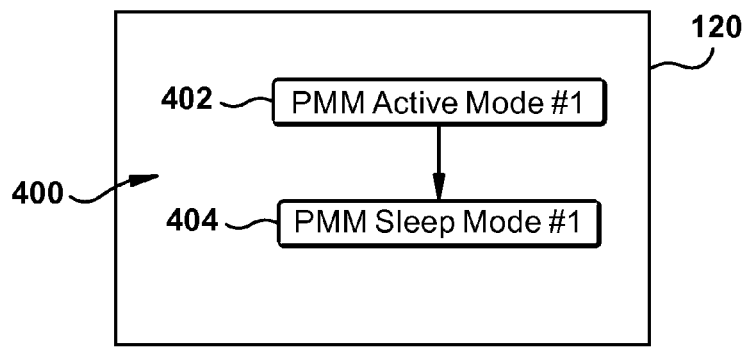
FIG. 4 is an example methodology of operating the PMM in an ignition ON state of the associated motor vehicle.

A methodology 400 of operating the PMM in the ignition ON state 120 (FIG. 1) of the associated motor vehicle is shown in a simplistic flow chart in FIG. 4 for ease of describing the example embodiment. While the vehicle is in the ignition ON state 120, the PMM 200 actively performs its functions in a PMM Active Mode #1 402 until all devices of the associated motor vehicle are fully booted and operational. Once all of the devices are fully booted and operational at step 402, the PMM 200 transitions into a PMM Sleep Mode #1 404 while the vehicle ignition is on. In the PMM Sleep Mode #1, hardware of the PMM 200 is powered on, but most of its software is idle or in a low power sleep mode.

Figure 5:
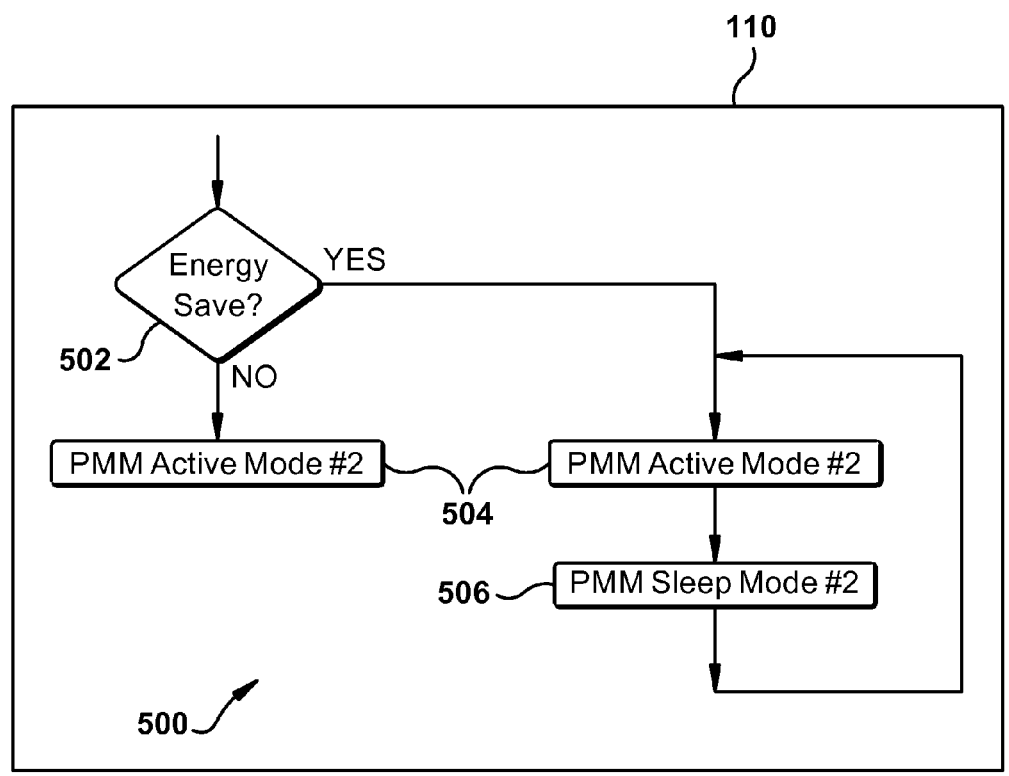
FIG. 5 is an example methodology of operating the PMM in an ignition OFF state of the associated motor vehicle.

A methodology 500 of operating the PMM in the ignition OFF state 110 (FIG. 1) of the associated motor vehicle is shown in a simplistic flow chart in FIG. 5 for ease of describing the example embodiment. When the vehicle is in the ignition OFF state, a decision is made at 502 whether the PMM 200 should either remain in a PMM Active Mode #2 504 continuously or alternate between the PMM Active Mode #2 504 and a PMM Sleep Mode #2 506. Alternating between the PMM Active Mode #2 504 and the PMM Sleep Mode #2 506 consumes less power than operating in the PMM Active Mode #2 504 at all times and hence consumes less battery 310 power.

Figure 6:
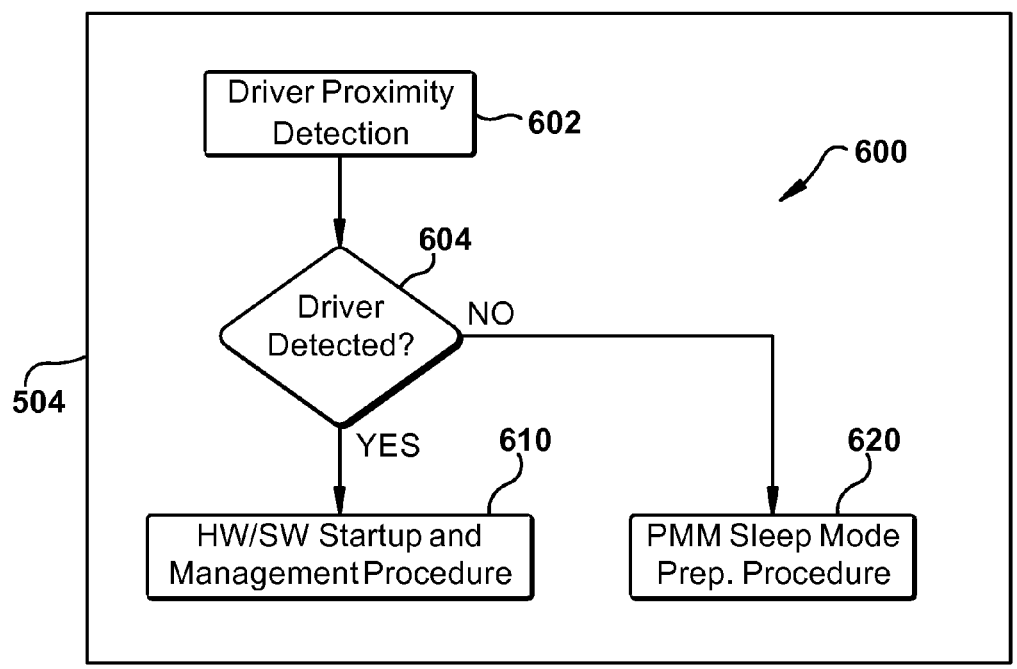
FIG. 6 is an example methodology of operating the PMM in an Active Mode during the operation shown in FIG. 5.

A methodology 600 of operating the PMM in the PMM Active Mode #2 504 (FIG. 5) during the ignition OFF state 110 (FIG. 1) of the associated motor vehicle is shown in a simplistic flow chart in FIG. 6 for ease of describing the example embodiment. While the PMM 200 is in the PMM Active Mode #2 504 (FIG. 5) and the vehicle is in the ignition OFF state 110, the control logic 210 of the PMM 200 executes a Driver Proximity Detection Procedure 602 to detect whether a driver of the associated motor vehicle is inside or otherwise within a predetermined activation range relative to the associated motor vehicle. In an example embodiment, the activation range is a predefined distance from the vehicle. If the driver is detected to be inside the activation range at step 604, the PMM remains in PMM Active Mode #2 and initiates a Hardware and Software Startup and Management Procedure 610. If, however, the driver is not detected to be within the activation range, the control logic 210 of the PMM 200 initiates a PMM Sleep Mode Preparation Procedure 620 to determine when and how long the next PMM Sleep Mode #2 506 (FIG. 5) should be.

The control logic 210 of the PMM 200 is operable to selectively execute the Driver Proximity Detection Procedure 602 to detect the driver's proximity to the vehicle and use the detection results to help determine whether and when to power on the device hardware modules 322, 324 and start the device software and application modules 332, 334 (FIG. 3). In the example embodiment, the Driver Proximity Detection Procedure 602 monitors radio transmissions from mobile devices such as those that may be carried by the driver, to detect how close the driver is to the associated vehicle or to the PMM 200. The driver's mobile device can be, for example, a key fob, smartphone, or the like.

In accordance with the example embodiment, different approaches can be used by the control logic 210 of the PMM 200 to use the driver's mobile devices to detect the driver's proximity. In an example embodiment, an application on the driver's mobile device periodically broadcasts a radio beacon, which is monitored by components of the PMM 200. In another example embodiment, the control logic 210 of the PMM 200 periodically broadcasts radio beacons which, when received by the driver's mobile device, triggers the mobile device to transmit messages to the PMM over a radio link. The radio beacons can be transmitted using any available radio technology such as unlicensed RF, WiFi, Bluetooth, Dedicated Short Range Communications (DSRC), or the like. In yet a further example embodiment, the control logic 210 of the PMM 200 uses regular cellular radio transmissions from the driver's smartphone to detect the relative proximity of the driver to the vehicle. In yet a still further example embodiment, the driver may use a mobile phone to send messages to the PMM 200 to instruct the control logic 210 of the PMM to boot up one or more selected devices 300 of the associated motor vehicle.

In the example embodiment, the PMM 200 uses the radio signals from the driver's mobile device to estimate the driver's proximity to the vehicle without necessarily requiring the driver's mobile devices to send explicit positioning information. For example, certain short range radios, such as the radio used by most vehicle key fobs, are capable of transmitting such a short distance that the PMM is only be able to receive their radio signals when the key fobs are within a couple of meters of the vehicles. The PMM 200 may also apply more sophisticated signal processing techniques as necessary or desired such as might be required for example in certain applications to analyze the radio signals received from a driver's mobile devices to estimate the proximity of these mobile devices to the vehicle. Furthermore, the radio beacons from the driver's mobile devices can also carry explicit information about the position of the transmitting device to help the PMM 200 determine the driver's proximity.

The control logic 210 of the PMM may also access off-board location services to help determine how far away the driver is from the vehicle. The driver can update its location to a location server, in a periodical or event-driven fashion. The PMM can retrieve the driver's last location update from the location server. The driver's last reported location and the elapsed time since the last location update can help the PMM estimate how long it may take the driver come to the activation range and hence how long the PMM 200 can wait in PMM Sleep Mode for the driver to arrive.

When the PMM 200 detects the driver to be within the activation range at step 604, the control logic 210 of the PMM 200 initiates the Hardware and Software Startup and Management Procedure 610 to power up the Device hardware and to start its software and application modules.

On the other hand, when the PMM 200 fails to detect the driver to be within the activation range at step 604, the control logic 210 of the PMM 200 initiates the PMM Sleep Mode Preparation Procedure 620. In accordance with the example embodiment, the PMM Sleep Mode Preparation Procedure 620 uses a statistical modeling technique to predict when it should transition into the PMM Sleep Mode #2 506 (FIG. 5) and how long it should stay in the Sleep Mode. The PMM transitions itself into the 'PMM Sleep Mode' at time t and stays in the PMM Sleep Mode for up to $T_{sleep}$ time units if it predicts that the driver is not likely to be within the activation range during time interval (t, t+$T_{sleep}$) and this time interval is long enough (e.g., when it is sufficiently longer than the time it takes to transition the PMM into 'PMM Sleep Mode' plus the time it takes for the PMM to later wake up and enter 'PMM Active Mode'). Upon the expiration of the 'PMM Sleep Mode,' the PMM transitions into 'PMM Active Mode' to run the 'Driver Proximity Detection Procedure' again.

In accordance with the embodiments, many different stochastic modeling techniques can be used to predict the start time and the duration of the next 'PMM Sleep Mode.' One example approach in accordance with the example embodiment is as follows below.

Let T be the random variable that represents the time between two consecutive times the driver is detected to enter the activation range. Let t be the current time and assume the driver is not detected to be inside the activation range currently. To predict the time duration δ between the current time t and the next time the driver is expected to enter the activation range, let P(δ) be the probability that T>(t+δ) given than T>t. That is $$P(\delta)=P(T>t+\delta|T>t)$$

Let α be the confidence level of the prediction, where α is a percentage up to 100%, the maximal duration $T_{sleep}$ that the PMM can stay in the 'PMM Sleep Mode' next time can be estimated as $$T_{sleep}=\max\{\delta|P(\delta)\geq\alpha\}$$

This means there is a percent certainty the driver will not enter the activation range during the next $T_{sleep}$ time units. Therefore, if $T_{sleep}$ is significantly longer than the time it takes for the PMM to transition into 'PMM Sleep Mode' plus the time it takes for the PMM to later wake up to enter 'PMM Active Mode' again, the PMM can enter 'PMM Sleep Mode' at some time in [t, t+$T_{sleep}$) and should wake up before time t+$T_{sleep}$.

In the example embodiment, (1-α) represents the probability that a prediction is wrong, which means that the device will be powered up prematurely. The value of α is configurable however. A small value of a will significantly reduce the amount of unnecessary device boot ups and the amount of unnecessary wait time a device will experience each time it is booted up.

In accordance with the embodiment, P(δ) is computed, wherein P(δ) is estimated based on the durations the PMM has been in 'PMM Sleep Mode' in the past. For example, the PMM can maintain a histogram of the past values of 'PMM Sleep Mode' durations with bin width equal to the unit time. Let H(n) denote the value of the $n^{th}$ bin in this histogram. Then P(δ) can be estimated as follows, where N is the total number of bins in the histogram:

$$P(\delta) = \frac{\sum_{i=t+\delta}^{N} H(i)}{\sum_{i=t}^{N} H(i)}$$

In practice, typically 25 to 30 samples of past durations the PMM has stayed in the 'PMM Sleep Mode' will be sufficient to derive adequate estimates.

It is to be appreciated that the PMM is not limited to the described methodologies but rather that other example embodiments can also use other stochastic models to predict its sleep durations. For example, time series analysis using Autoregressive Integrated Moving Average (ARIMA) models can be used to predict the next sleep duration by modeling the correlations among recent sleep durations. The Wiener processes may also be used, which predict the next value of a stochastic process based on its most recent past value and statistics derived from its recent past samples.

Figure 7:
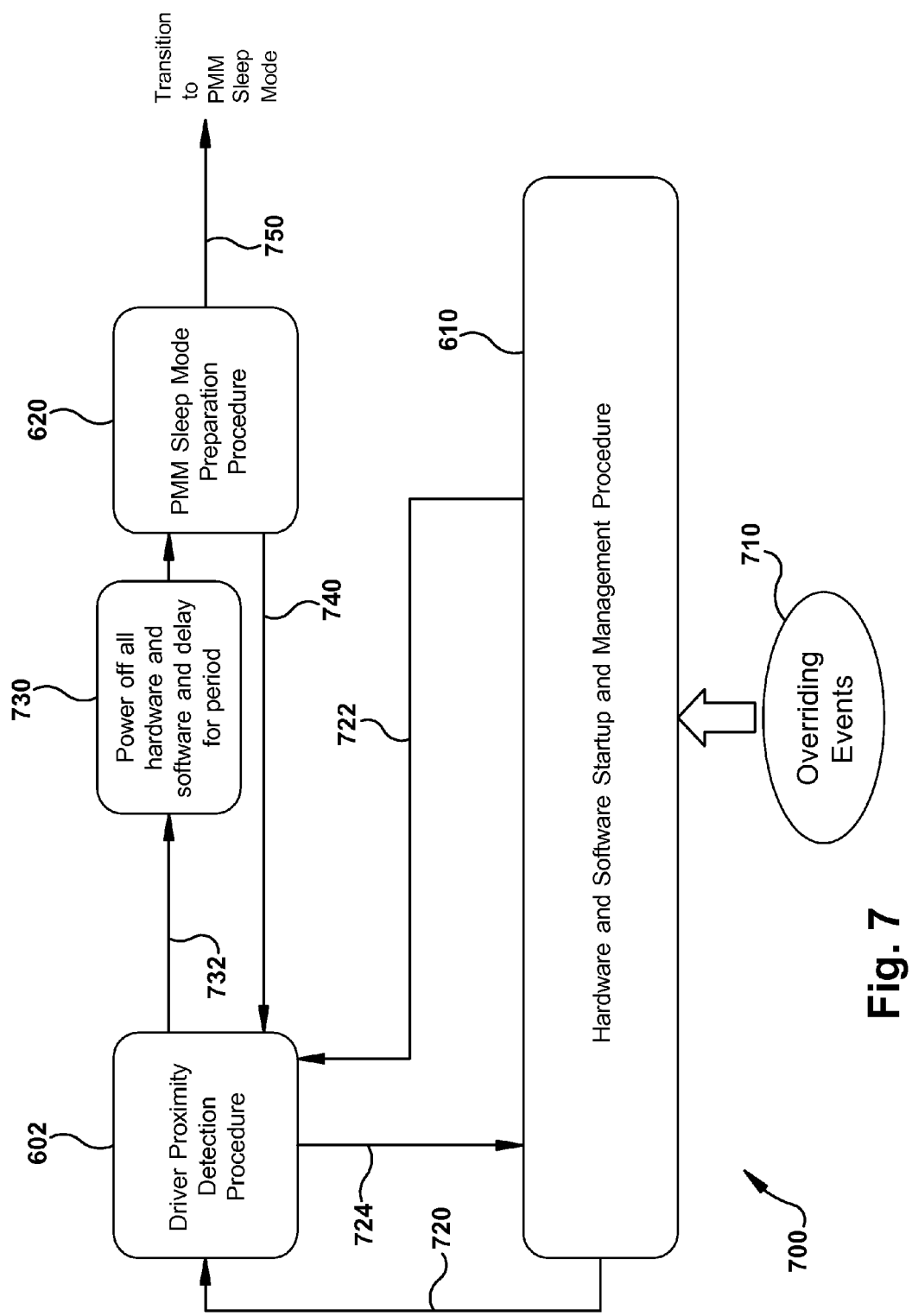
FIG. 7 is a high level functional flow block diagram showing the PMM in an Active Mode in accordance with an example embodiment.

FIG. 7 is a high level block diagram showing a functional flow 700 of the PMM in an Active Mode in accordance with an example embodiment. The hardware and software startup and management procedure 610 of the PMM 200 described above is responsive to a set of selected external overriding and/or triggering events 710 to enter into the driver proximity detection procedure 602 as described above. In one functional flow 720, the trigger events include the device or the software of the device and its applications being powered off or being in a power-saving mode. The trigger events may also include the PMM determining on its own for various reasons to initiate the driver proximity detection procedure 602. In another functional flow 722, the trigger event includes the ignition of the associated vehicle being turned off.

The functional flows 720, 722 may be selectively reversed in flow 724 when the user of the associated vehicle is detected to be within a predetermined proximity or an activation range of the vehicle, or when a statistical value S calculated estimating a probability of the user moving towards the vehicle or about to initiate operation of the vehicle exceeds a predetermined threshold. For these events, the flow 724 causes the PMM to transition from the driver proximity detection procedure 602 to the hardware and software startup and management procedure 610.

The PMM 200 selectively transitions from the driver proximity detection procedure 602 to a procedure for powering off all hardware and software modules 320, 330 and entering into a delay 730 in accordance with trigger events at functional flow 732 including the user of the vehicle not being in the activation range, the statistical value S not being exceeded, or the hardware and timer expiring. From this procedure 730 the PMM may selectively enter into the sleep mode preparation procedure 620 described above in connection with FIG. 6 after a predetermined delay period. Thereafter, a functional flow 740 may be caused by triggering events including a determination by the PMM of an insufficient time being available for sleeping. The PMM may transition at 750 to the sleep mode however, in accordance with a determination of a sufficient time being available for sleeping.

Figure 8:
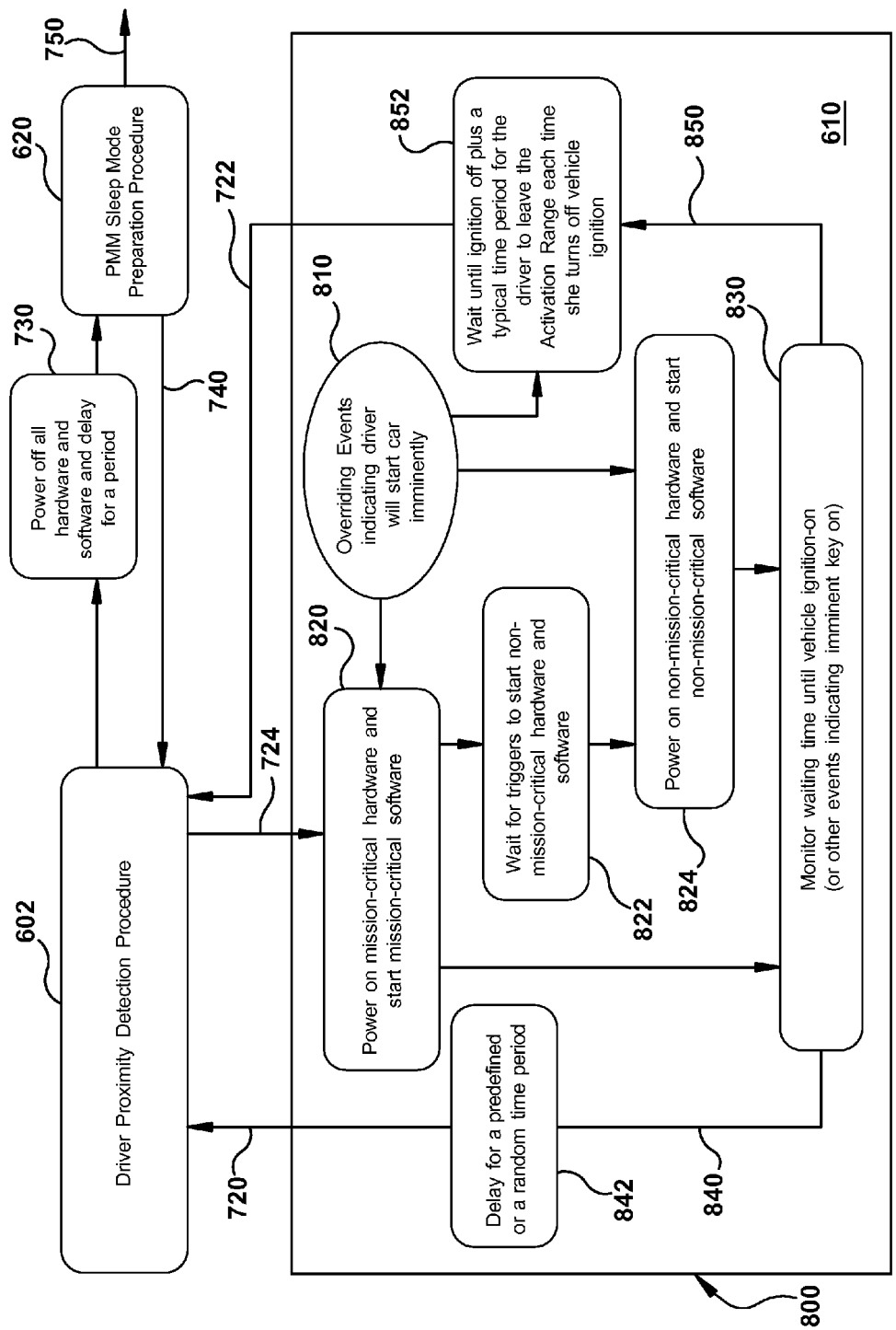
FIG. 8 is a control diagraph showing operation of the PMM in accordance with an example embodiment.

FIG. 8 is a control diagraph showing operation of the PMM in accordance with an example embodiment showing in particular workings of the hardware and software startup and management procedure 610 in accordance with the example embodiment. The functional events and actions 800 illustrated in this diagraph is by way of example only and is not intended to limit the operation of any alternative embodiments. With reference now to that Figure, the PMM 200 is responsive to a set of one or more triggering and/or overriding event(s) 810 such as for example a triggering and overriding event indicating that the user of the associated vehicle will imminently start the vehicle. The PMM executes a first procedure 820 for initiating power on to mission critical hardware modules 322 and the mission critical software modules 332. Thereafter, the PMM executes a delay procedure 822 until receiving a trigger indicating one or more triggering and/or an overriding event(s) 810 to execute at 824 a procedure for initiating power on to mission non-critical hardware modules 324 and the mission non-critical software modules 334.

For purposes of describing the example embodiment, overriding events are any one or more event(s) or combinations of any events that are unexpected for the state or mode that the PMM is in. As an example, if the PMM detects the opening of the driver's door of the vehicle without detecting the close proximity of any driver to the vehicle, both of the first and second procedures 820, 824 are initiated for administering power on to the mission critical hardware and to the mission non-critical hardware, respectively. In accordance with a further example, the detection of an "ignition on" condition regardless of the state or mode the PMM is in trigger initiations of the first and second procedure 820, 824 as well. Thereafter the PMM may enter into a delay mode or state 852 described below.

The PMM 200 executes at 830 a procedure to wait for a predetermined time period until the ignition of the associated vehicle is turned on, until one or more other triggering and/or overriding events are determined, or until a time period expires wherein the time period is statistically determined using one or more of the stochastic modeling techniques described above. When the wait time period of the procedure 830 is exceeded, the PMM functional flow 840 next executes a delay at 842 until entering into the driver proximity detection procedure 602 described above in connection with FIG. 6. Alternatively, the PMM functional flow 850 executes a delay at 852 until the ignition of the associated vehicle is turned off and the user leaves the activation region before entering into the driver proximity detection procedure 602. It is to be appreciated that in accordance with the example embodiments herein, the wait and delay periods executed by the PMM in the several modes or states are for selected time periods preferably determined statistically using any one or more of the stochastic modeling techniques described above.

Figure 9:
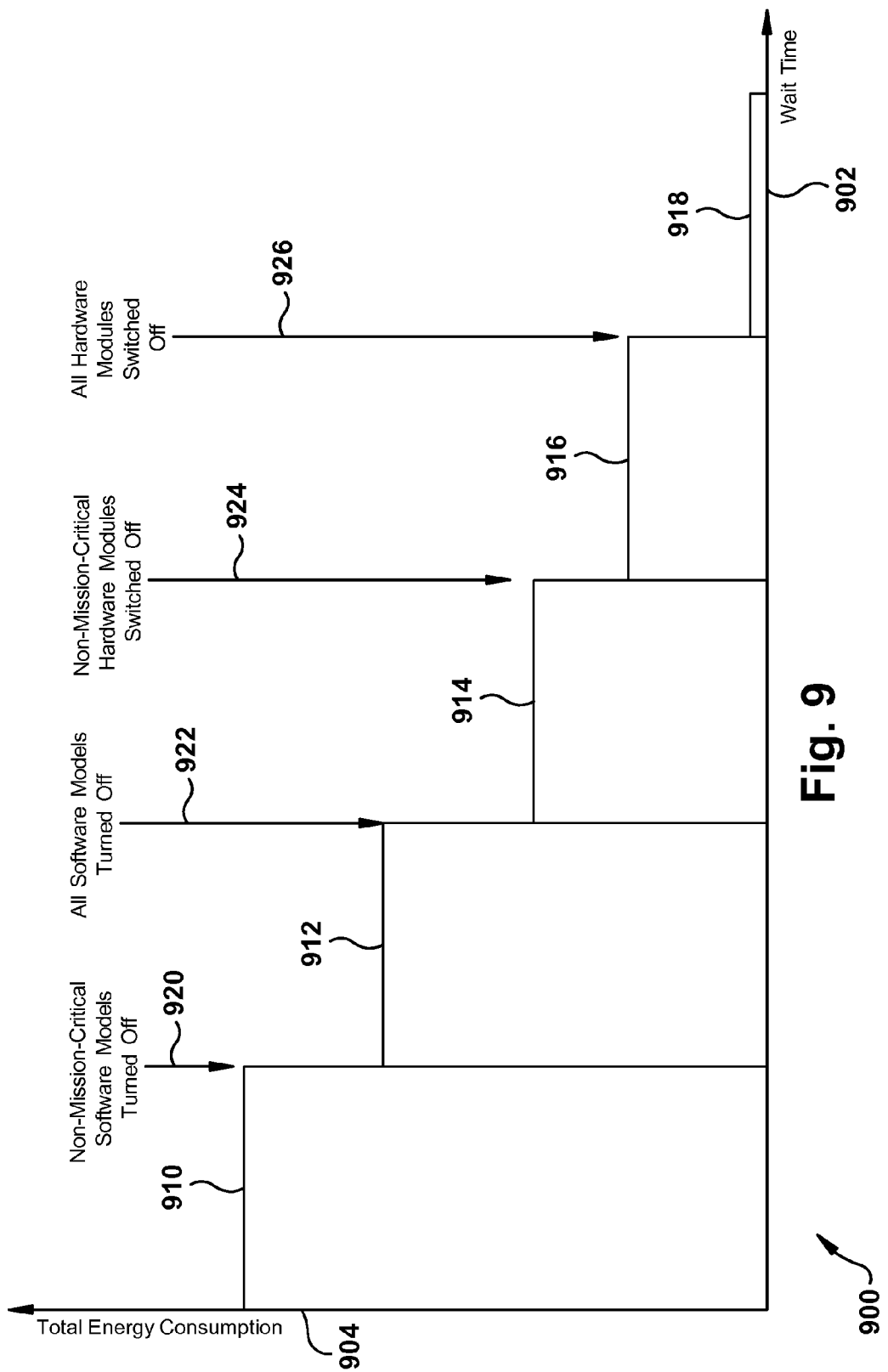
FIG. 9 is a chart showing several operational modes of the PMM in accordance with an example embodiment.

FIG. 9 is a chart showing several operational modes 900 of the PMM 200 in accordance with an example embodiment. Example uses of power modes 900 and transitions from one power mode to another are shown. It is to be appreciated, however, that other power modes and other transitions and transition triggering or overriding events are possible in accordance with further embodiments herein.

In FIG. 9, the several power modes 900 are illustrated plotted against a time axis 902 and a total energy consumption axis 904 for ease of description and understanding. In addition, a set of five (5) modes 900 are illustrated including a Full Active Mode 910, a Power Saving Mode 1 912, a Power Saving Mode 2 914, a Power Saving Mode 3 916, and a Power Saving Mode 4 912.

In accordance with the example embodiment, the mission critical hardware modules 322, the non-mission critical hardware modules 324, the mission critical software modules 332, and the non-mission critical software modules 334 are separately controlled by the control logic 210 of the PMM 200 in the set of five (5) modes described. However, the devices of the associated vehicle can be controlled in several other combinations as may be necessary or desired.

In the simplistic example shown in the Figure, in accordance with the example embodiment, at a transition from the Full Active Mode 910 to the Power Saving Mode 1 912, non-mission critical software modules are turned off by the PMM 200. At a transition from the Power Saving Mode 1 912 to the Power Saving Mode 2 914, all software modules are turned off by the PMM 200. At a transition from the Power Saving Mode 2 914 to the Power Saving Mode 3 916, non-mission critical hardware modules are turned off by the PMM 200. At a transition from the Power Saving Mode 3 916 to the Power Saving Mode 4 918, all hardware modules are turned off by the PMM 200. It is to be appreciated that the total energy consumption 904 is decreased at each transition, and the wait time 902 between transitions increases.

Further in the example embodiment shown in FIG. 9, at a transition from the Power Saving Mode 4 918 to the Power Saving Mode 3 916, all hardware modules are turned on by the PMM 200. At a transition from the Power Saving Mode 3 916 to the Power Saving Mode 2 914, non-mission critical hardware modules are turned on by the PMM 200. At a transition from the Power Saving Mode 2 914 to the Power Saving Mode 1 912, all software modules are turned on by the PMM 200. Lastly, at a transition from the Power Saving Mode 1 912 to the Full Active Mode 910, non-mission critical software modules are turned on by the PMM 200. It is to be appreciated that the total energy consumption 904 is increased at each transition, and the wait time 902 between transitions decreases.

As noted above, the device hardware modules 320 are grouped into mission-critical 322 and non-mission-critical 324 modules (FIG. 3). The power to the mission-critical modules and the non-mission-critical modules is controlled by separate switches 302 and 31, 318 on the power supply line from the associated vehicle battery 310. Similarly, the software and application modules 330 on the device are grouped into mission-critical 332 and non-mission-critical 334 modules in a way that mission-critical software modules 332 can be started before non-mission-critical software modules 334.

Mission critical hardware and software modules can be switched on and started immediately upon the driver is detected to be inside the Activation Range. The non-mission-critical modules can be powered on and started at a later time in response to additional triggering and/or overriding events indicating that the driver will use the vehicle imminently. These triggers include, for example, the driver door is unlocked or opened, or the ignition is being turned on (FIG. 8).

In accordance with the example embodiment, the control logic 210 executes a power management policy to govern when power should be applied to the hardware modules and when the software modules should be booted up and/or down. This policy may be selectively updated over the air by a server in the cloud. The cloud-based server can use information aggregated from multiple vehicles as necessary or desired to optimize the power management policy and then update the policies onboard each vehicle.

To further ensure that one or more selected devices of the associated vehicle will be switched on in a timely fashion in accordance with the embodiments herein, the control logic 210 of the PMM 200 considers not only whether the driver is inside the Activation Range but also other factors that can help determine how soon the vehicle may need to be turned on. These factors include, for example, whether the driver is approaching the vehicle or moving away from it. In this regard, in accordance with an example embodiment, S is used to denote the likelihood that the vehicle will be keyed on each time the driver is detected to be inside the Activation Range. The value of S ranges from 0 to 1. The control logic 210 of the PMM 200 estimates the value of S each time it detects the driver to be inside the Activation Range and turns on a device of the set 300 of devices of the associated vehicle when the S value exceeds a predefined threshold. A default approach of the example embodiment is to set S to 1 as soon as the driver is detected inside the Activation Range, which means that the device will be switched on as soon as the driver is detected to be inside the Activation Range.

More sophisticated approaches in accordance with further example embodiments take into account other factors to estimate the value of S. For example, the control logic 210 of the PMM 200 monitors the strength of the direct short range radio between the driver's mobile device and the PMM. An increasing signal strength indicates that the driver is approaching the vehicle and hence a higher value of S. A faster increase in the signal strength indicates a higher speed in which the driver is moving toward the vehicle and hence a higher value of S. Conversely, decreasing signal strength indicates that the driver is moving away from the vehicle. Using this approach, S is modeled by the control logic 210 of the PMM 200 as a function of the driver's distance to the vehicle and the change in the signal strength of the driver's mobile device.

The driver can also be inside the Activation Range for an extended period of time with no intention to actually start the car. In such cases, it may be unnecessary to hold or otherwise maintain the one or more devices of the associated vehicle fully powered on or have its software and application modules running. Therefore, multiple power-saving modes 900 are applied by the control logic 210 of the PMM 200. In accordance with the example embodiment, after any subset of the hardware modules on the one or more devices of the associated vehicle is switched on, the PMM monitors how long it has been waiting until the vehicle ignition is turned on and uses the results to determine which power mode the device should enter and how long the device should stay in each power mode. Any one or more of the statistical modeling approaches as described above may be used by the control logic 210 of the PMM 200 to determine when to start its own PMM Sleep Mode and how long it should stay in the PMM Sleep Mode. The stochastic modeling techniques described herein are used to predict how long the device will wait for the vehicle ignition to be turned on.

While waiting for the ignition to be turned on, the device of the associated vehicle may stay in one of the power modes for a predetermined residence time. Alternatively, the control logic 210 of the PMM 200 uses a statistical modeling technique to dynamically estimate the residence time of the device for each power mode based on historical data it has collected regarding how long the device stayed in this power mode in the past. This includes predicting when the device and the application modules on it should be started up and when they should enter full active mode. This allows the device and the application modules on it to be able to spend the least possible time to transition into fully active mode when needed. The prediction can be achieved using any one or more of the statistical models used by the PMM as described above to estimate the starting times and the durations for its own PMM Sleep Mode 2 506 (FIG. 5).

The methods used herein in accordance with the example embodiments to determine how long the device will have to wait for the vehicle ignition to be turned on and how long the device should stay in each power mode further take into account additional contextual information such as the location of the associated vehicle and the time of day. For example, a condition of the vehicle being parked inside a garage and the mobile device of the driver being inside the house but away from the garage, can be sufficient close to the vehicle to trigger device wakeup. Therefore, in an example embodiment, the control logic 210 of the PMM 200 dynamically adjusts the threshold of the activation range depending on the location of the vehicle and other contextual information.

The one or more devices of the associated vehicle can be controlled responsive to triggering and overriding events to transition from one power mode to another. Overriding events are events that will trigger the one or more devices to change their power mode. For example, the Ignition-On event should trigger the device to transition into a full active mode immediately.

Figure 10:
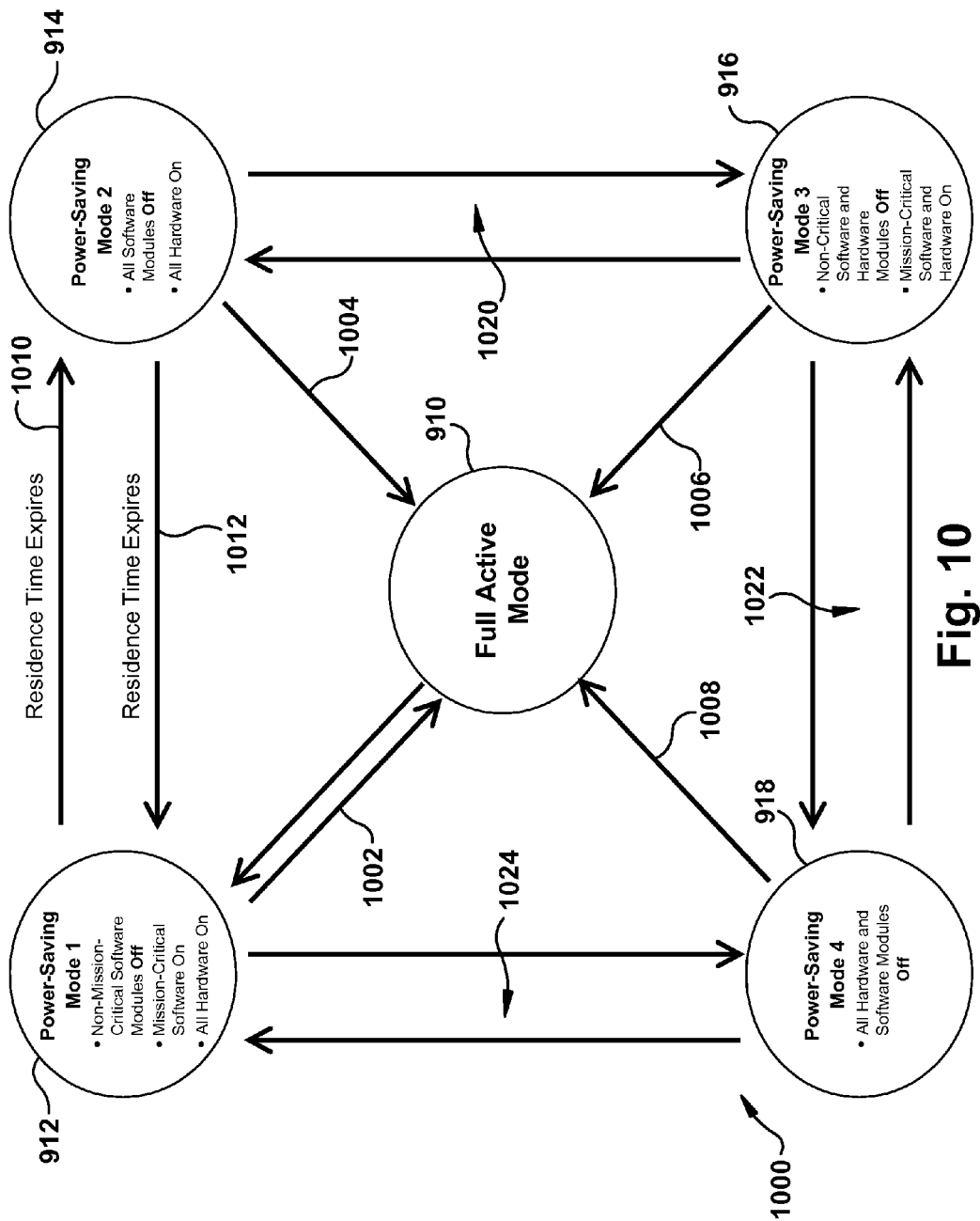
FIG. 10 is a state transition diagraph showing several power modes of the PMM in accordance with an example embodiment.

FIG. 10 is a state transition diagraph showing several power modes of the PMM in accordance with an example embodiment. With reference now to that Figure, the PMM 200 may transition from any one of the power saving modes 1-3 912-918 in response to one or more overriding events 1002-1008 such as, for example, the transition of the ignition key from the ON condition 110 (FIG. 1) to the OFF condition 120.

In addition, in accordance with the embodiments, each time the vehicle ignition is turned off, the PMM transitions state from PMM Sleep Mode #1 404 (FIG. 4) to the PMM Active Mode #2 504 (FIG. 5). It then waits for the driver to exit the Activation Range, or the S value to fall below the threshold, or a wait timer expires, to shut down all hardware and software modules and initiate the PMM Sleep Mode Preparation Procedure 620 (FIG. 6) to determine whether and when the PMM should enter PMM Sleep Mode #2 506 and for how long the PMM should reside in the PMM Sleep Mode #2 506.

The control logic 210 of the PMM 200 selectively transitions between the Power Saving Modes 912-918 in accordance the expiration of a predetermined residence time spent in the current state. For example, the PMM may transition from the Power Saving Mode 1 912 to the Power Saving Mode 2 914 at 1010 upon the expiration of a timer set for residence in the Power Saving Mode 1 912. Similarly, the PMM may transition from the Power Saving Mode 2 914 to the Power Saving Mode 1 912 at 1012 upon the expiration of a timer set for residence in the Power Saving Mode 2 914. The one or more wait timer values can be preset or dynamically estimated using the same statistical model the PMM uses to estimate the length of its own 'PMM Sleep Mode'. Similar state mode transitions 1020, 1022, and 1024 are selectively executed by the PMM 200 as well.

In accordance with an embodiment, each time the PMM enters the 'PMM Sleep Mode', it stays in this mode for either a predefined or dynamically estimated time duration before it wakes up to resume the Driver Proximity Detection 602 procedure. Any one or more of the statistical models used by the PMM to estimate the starting times and the lengths of its own 'PMM Sleep Mode' as described above are used to estimate the length of this random delay.

In accordance with further example embodiments, while the mission-critical hardware and software modules are booted up and the devices are waiting for the vehicle ignition to be turned on, the PMM is operative to determine whether the CPU clock speed of the device should be lowered or otherwise reduced to further reduce battery power consumption by the device. If the PMM determines to lower the device's clock speed, it sends a signal to a control software on the device to trigger it to lower the device's CPU clock speed. This signal triggers the device's CPU clock to be lowered after the mission critical software modules finish their initialization procedures. The CPU clock of the device returns to its normal speed when the device is triggered by any event to boot up its non-mission-critical hardware and software modules. Additionally, if the hardware allows, the same mechanism can also be used to lower operating voltage of the device. Different modalities of changing operating frequency and voltage can be implemented. This technique of reducing clock speed and operating voltage can result in further reduction of standby power while keeping the system almost ready to jump into fully activated mode.

Figure 11:
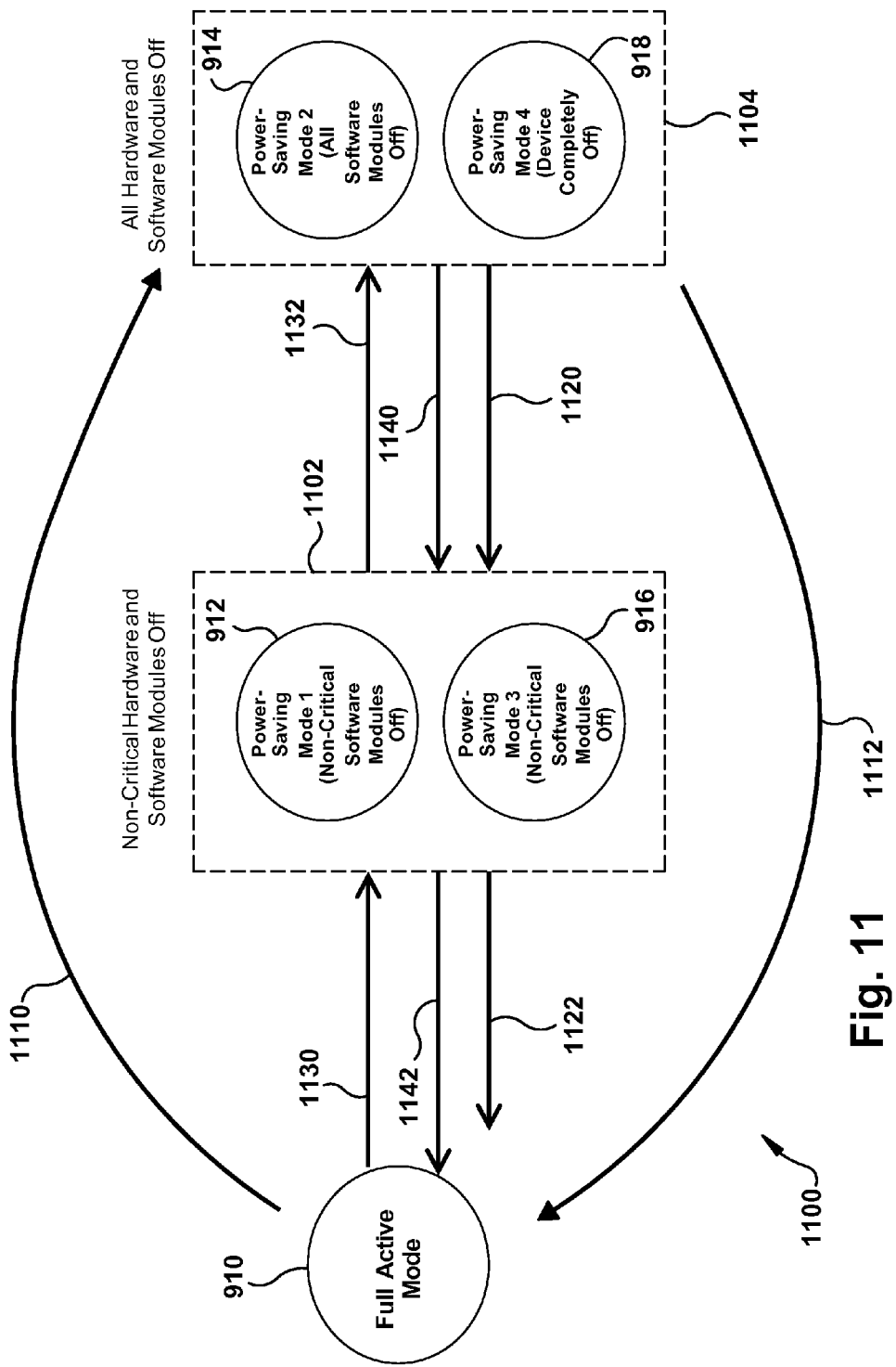
FIG. 11 is a state transition diagram between power modes of the PMM in accordance with an example embodiment

FIG. 11 is a further example state transition diagram between power modes of the PMM in accordance with an embodiment. With reference now to that Figure, the first and third power saving modes 912, 916 form a first super power saving mode 1102 wherein all non-critical hardware and software modules 324, 334 are turned OFF. Also, a second super power saving mode 1104 is formed wherein all comprising the second and fourth power saving modes 914, 918 wherein all hardware and software modules 320, 330 are turned OFF. The PMM may transition directly from the full active mode 910 to the second super power saving mode 1104 at 1110 responsive to a first overriding event. Conversely, the PMM may transition directly from the second super power saving mode 1104 to the full active mode 910 at 1112 responsive to a second overriding event. Further, the PMM may transition indirectly from the second super power saving mode 1104 to the full active mode 910 at 1120 and 1122 by first passing through the first super power saving mode 1102 responsive to third and fourth overriding events.

Further in addition to the above, the PMM may transition between the full active mode 910 and the first and second super power saving modes 1102, 1104 the upon the expiration of one or more timer set for residence in the Power Saving Modes. In this regard, the PMM may transition from the full active mode 910 to the first super power saving mode 1102 at 1130 responsive to the expiration of a first predetermined residence time. The PMM may transition from the first super power saving mode 1102 to the second super power saving mode 1104 at 1132 responsive to the expiration of a second predetermined residence time. The PMM may transition from the second super power saving mode 1104 to the first super power saving mode 1102 at 1140 responsive to the expiration of a third predetermined residence time. Lastly, the PMM may transition from the first super power saving mode 1102 to the full active mode 910 at 1142 responsive to the expiration of a fourth predetermined residence time. The same statistical model used by the PMM to estimate the starting times and the lengths of its own 'PMM Sleep Mode' as described above are used to estimate the length of the first through fourth residence times.

Figure 12:
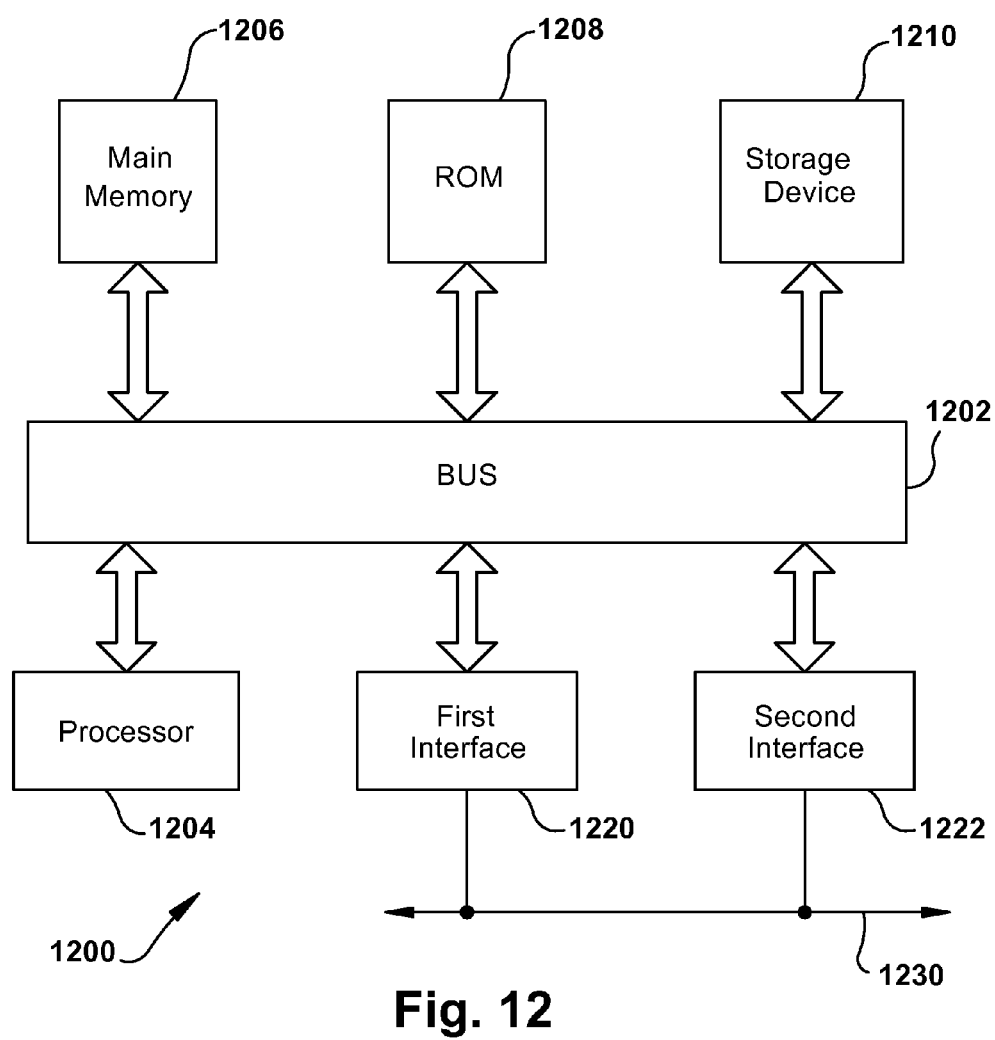
FIG. 12 is a block diagram illustrating an example embodiment of a computer system upon which an example embodiment can be implemented.

FIG. 12 is a block diagram illustrating an example of a computer system 1200 upon which an example embodiment can be implemented. Computer system 1200 may be employed to implement the functionality of the logic in controller 110 (FIG. 1), the control logic 210 of the access point 200 (FIG. 2), and/or the gateway logic 310 in the enterprise network controller apparatus 300 (FIG. 3).

Computer system 1200 includes a bus 1202 or other communication mechanism for communicating information and a processor 1204 coupled with bus 1202 for processing information. Computer system 1200 also includes a main memory 1206, such as random access memory (RAM) or other dynamic storage device coupled to bus 1202 for storing information and instructions to be executed by processor 1204. Main memory 1206 also may be used for storing a temporary variable or other intermediate information during execution of instructions to be executed by processor 1204. Computer system 1200 further includes a read only memory (ROM) 1208 or other static storage device coupled to bus 1202 for storing static information and instructions for processor 1204. A storage device 1210, such as a magnetic disk, optical disk, and/or flash storage, is provided and coupled to bus 1202 for storing information and instructions.

An aspect of the example embodiment is related to the use of computer system 1200 for providing detection of service instances available in a network, caching the detected network service instances, and advertising the cached detected network services to client devices in accordance with a physical location of the querying client device in a location aware service instance utility. According to an example embodiment, detecting, caching, and advertising network service instances is provided by computer system 1200 in response to the processor 1204 executing one or more sequences of one or more instructions contained in a non-transitory main memory 1206. Such instructions may be read into main memory 1206 from another computer-readable medium, such as storage device 1210. Execution of the sequence of instructions contained in main memory 1206 causes processor 1204 to perform the process steps described herein. One or more processors in a multi-processing arrangement may also be employed to execute the sequences of instructions contained in main memory 1206. In alternative embodiments, hard-wired circuitry may be used in place of or in combination with software instructions to implement an example embodiment. Thus, embodiments described herein are not limited to any specific combination of hardware circuitry and software.

The term "computer-readable medium" as used herein refers to any non-transitory medium that participates in providing instructions to processor 1204 for execution. Such a medium may take many forms, including but not limited to non-volatile media, and volatile media. Non-volatile media include for example optical or magnetic disks, such as storage device 1210. Volatile media include dynamic memory such as main memory 1206. As used herein, tangible media may include any non-transitory media such as a volatile and non-volatile media. Common forms of computer-readable media include for example floppy disk, a flexible disk, hard disk, magnetic cards, paper tape, any other physical medium with patterns of holes, a RAM, a PROM, an EPROM, a FLASH-PROM, CD, DVD or any other memory chip or cartridge, or any other medium from which a computer can read.

Various forms of computer-readable media may be involved in carrying one or more sequences of one or more instructions to processor 1204 for execution. For example, the instructions may initially be borne on a magnetic disk of a remote computer. The remote computer can load the instructions into its dynamic memory and send the instructions over a telephone line using a modem. A modem local to computer system 1200 can receive the data on the telephone line and use an infrared transmitter to convert the data to an infrared signal. An infrared detector coupled to bus 1202 can receive the data carried in the infrared signal and place the data on bus 1202. Bus 1202 carries the data to main memory 1206 from which processor 1204 retrieves and executes the instructions. The instructions received by main memory 1206 may optionally be stored on storage device 1210 either before or after execution by processor 1204.

Computer system 1200 also includes a communication interface 1218 comprising first and second communication interfaces 1220, 1222 operatively coupled with the bus 1202. Communication interface 1218 provides a two-way data communication coupling computer system 1200 to a communication link 1230. For example, communication interface 1218 may be a local area network (LAN) card to provide a data communication connection to a compatible LAN such as for example a Controller Area Network (CAN) network. As another example, communication interface 1218 may be an integrated services digital network (ISDN) card or a modem to provide a data communication connection to a corresponding type of telephone line. Wireless links may also be implemented. In any such implementation, communication interface 1218 sends and receives electrical, electromagnetic, or optical signals that carry digital data streams representing various types of information.

Described above are example embodiments. It is, of course, not possible to describe every conceivable combination of components or methodologies, but one of ordinary skill in the art will recognize that many further combinations and permutations of the example embodiments are possible. Accordingly, this application is intended to embrace all such alterations, modifications and variations that fall within the spirit and scope of the appended claims interpreted in accordance with the breadth to which they are fairly, legally and equitably entitled.

The invention claimed is:

1. An apparatus comprising:
an interface operatively coupled with a power consuming device of an associated motor vehicle; and
control logic coupled with the interface;
wherein the control logic is operable in a plurality of modes comprising at least a first mode and a second mode;
wherein the control logic is operable in the first mode to perform processing for determining a presence of a first condition of the associated motor vehicle;
wherein the control logic is operable in the first mode to selectively activate the power consuming device of the associated motor vehicle, via the interface, responsive to determining the presence of the first condition;
wherein the control logic is operable in the second mode to suspend, via the interface, the processing for determining the presence of the first condition of the associated motor vehicle;
wherein the control logic selectively transitions between the first and second modes in accordance with a stochastic modeling of the presence of the first condition over time.

2. The apparatus according to claim 1, wherein:
the control logic selectively transitions to the second mode and remains in the second mode for a sleep time period $T_{sleep}=\max\{\delta|P(\delta)\geq\alpha\}$, where $\alpha$ is a percent certainty the first condition of the associated motor vehicle will not occur during predetermined next $T_{sleep}$ time units, and $\delta$ is a time duration between a current time t and a next expected time of an occurrence of the first condition of the associated motor vehicle.

3. The apparatus according to claim 1, wherein:
the interface is operatively coupled with a mission critical power consuming device of the associated motor vehicle and with a non-mission critical power consuming device of the associated motor vehicle;
the control logic is operative in the first mode to perform processing to determine a presence of a user of the associated motor vehicle within a predetermined proximity to the associated motor vehicle as the first condition of the associated motor vehicle;
the control logic is operative in the first mode to activate the mission critical power consuming device of the associated motor vehicle and to suspend activation of the non-mission critical power consuming device responsive to determining the presence of the user within the predetermined proximity to the associated motor vehicle.

4. The apparatus according to claim 3, wherein:
the control logic is operative in the first mode to perform processing to determine an impending use of the associated motor vehicle as a second condition of the associated motor vehicle;
the control logic is operative in the first mode to activate the non-mission critical power consuming device of the associated motor vehicle responsive to determining the impending use of the associated motor vehicle as the second condition of the associated motor vehicle.

5. The apparatus according to claim 1, wherein:
the interface is operatively coupled with a set of hardware modules of the associated motor vehicle and a set of software modules of the associated motor vehicle;
the control logic is operable in a plurality of power saving modes comprising at least a full active mode wherein the control logic selectively activates the set of hardware modules and the set of software modules, and a first power saving mode wherein the control logic selectively deactivates at least one of the set of hardware modules or the set of software modules; and
the control logic selectively transitions between the full active mode and the first power saving mode in accordance with a stochastic modeling of a use condition of the associated motor vehicle by an associated user of the vehicle over time.

6. The apparatus according to claim 1, wherein:
the control logic is operable in the first mode to selectively activate the power consuming device of the associated motor vehicle responsive to: i) determining a presence of a user of the associated motor vehicle within a predetermined proximity to the associated motor vehicle, and ii) determining a likelihood S that the associated motor vehicle will be keyed on each time the associated user enters into the predetermined proximity to the associated motor vehicle.

7. The apparatus according to claim 1, wherein:
the control logic is operable in the first mode to selectively activate the power consuming device of the associated motor vehicle responsive to: i) determining a presence of a user of the associated motor vehicle within a predetermined proximity to the associated motor vehicle, and ii) determining a rate of movement of the associated user above a predetermined threshold towards the associated motor vehicle.

8. A method comprising:
operating control logic in a plurality of modes comprising at least a first mode and a second mode;
performing processing by the control logic when operating in the first mode for determining a presence of a first condition of an associated motor vehicle;
selectively activating, by the control logic when operating in the first mode, a power consuming device of the associated motor vehicle, via an interface coupled with the control logic and operatively coupled with the power consuming device, responsive to determining by the control logic the presence of the first condition;
suspending, by the control logic when operating in the second mode, the processing for determining the presence of the first condition of the associated motor vehicle; and
selectively transitioning the control logic between the first and second modes in accordance with a stochastic modeling of the presence of the first condition over time.

9. The method according to claim 8, further comprising:
selectively transitioning the control logic to the second mode and remaining in the second mode for a sleep time period $T_{sleep}=\max\{\delta|P(\delta)\geq\alpha\}$, where $\alpha$ is a percent certainty the first condition of the associated motor vehicle will not occur during predetermined next $T_{sleep}$ time units, and $\delta$ is a time duration between a current time t and a next expected time of an occurrence of the first condition of the associated motor vehicle.

10. The method according to claim 8, further comprising:
performing processing by the control logic operating in the first mode to determine a presence of a user of the associated motor vehicle within a predetermined proximity to the associated motor vehicle as the first condition of the associated motor vehicle;
activating a mission critical power consuming device of the associated motor vehicle and to suspending activation of a non-mission critical power consuming device by the control logic operating in the first mode responsive to determining the presence of the user within the predetermined proximity to the associated motor vehicle.

11. The method according to claim 10, further comprising:
performing processing by the control logic operating in the first mode to determine an impending use of the associated motor vehicle as a second condition of the associated motor vehicle;
activating the non-mission critical power consuming device of the associated motor vehicle by the control logic operating in the first mode responsive to determining the impending use of the associated motor vehicle as the second condition of the associated motor vehicle.

12. The method according to claim 8, further comprising:
operating the control logic in a plurality of power saving modes comprising at least a full active mode wherein the control logic selectively activates a set of hardware modules and a set of software modules, and a first power saving mode wherein the control logic selectively deactivates at least one of the set of hardware modules or the set of software modules; and
selectively transitioning the control logic between the full active mode and the first power saving mode in accordance with a stochastic modeling of a use condition of the associated motor vehicle by an associated user of the vehicle over time.

13. The method according to claim 8, further comprising:
selectively activating by the control logic operating in the first mode the power consuming device of the associated motor vehicle responsive to: i) determining a presence of a user of the associated motor vehicle within a predetermined proximity to the associated motor vehicle, and ii) determining a likelihood S that the associated motor vehicle will be keyed on each time the associated user enters into the predetermined proximity to the associated motor vehicle.

14. The method according to claim 8, further comprising:
selectively activating by the control logic operating in the first mode the power consuming device of the associated motor vehicle responsive to: i) determining a presence of a user of the associated motor vehicle within a predetermined proximity to the associated motor vehicle, and ii) determining a rate of movement of the associated user above a predetermined threshold towards the associated motor vehicle.

15. Logic encoded in one or more tangible non-transient computer readable media for execution by a processor and when executed by the processor the logic being operable to:
operate control logic in a plurality of modes comprising at least a first mode and a second mode;

perform processing by the control logic operating in the first mode for determining a presence of a first condition of an associated motor vehicle;

selectively activate, by the control logic operating in the first mode, a power consuming device of the associated motor vehicle, via an interface coupled with the control logic and operatively coupled with the power consuming device, responsive to determining by the control logic the presence of the first condition;

suspend by the control logic operating in the second mode the processing for determining the presence of the first condition of the associated motor vehicle; and selectively transition the control logic between the first and second modes in accordance with a stochastic modeling of the presence of the first condition over time.

16. The logic according to claim 15, further operable to:

selectively transition the control logic to the second mode and remaining in the second mode for a sleep time period $T_{sleep}=\max\{\delta|P(\delta)\geq\alpha\}$, where $\alpha$ is a percent certainty the first condition of the associated motor vehicle will not occur during predetermined next $T_{sleep}$ time units, and $\delta$ is a time duration between a current time t and a next expected time of an occurrence of the first condition of the associated motor vehicle.

17. The logic according to claim 15, further operable to:

perform processing by the control logic operating in the first mode to determine a presence of a user of the associated motor vehicle within a predetermined proximity to the associated motor vehicle as the first condition of the associated motor vehicle;

activate a mission critical power consuming device of the associated motor vehicle and to suspending activation of a non-mission critical power consuming device by the control logic operating in the first mode responsive to determining the presence of the user within the predetermined proximity to the associated motor vehicle.

18. The logic according to claim 17, further operable to:

perform processing by the control logic operating in the first mode to determine an impending use of the associated motor vehicle as a second condition of the associated motor vehicle;

activate the non-mission critical power consuming device of the associated motor vehicle by the control logic operating in the first mode responsive to determining the impending use of the associated motor vehicle as the second condition of the associated motor vehicle.

19. The logic according to claim 15, further operable to:

operate the control logic in a plurality of power saving modes comprising at least a full active mode wherein the control logic selectively activates a set of hardware modules and a set of software modules, and a first power saving mode wherein the control logic selectively deactivates at least one of the set of hardware modules or the set of software modules; and selectively transition the control logic between the full active mode and the first power saving mode in accordance with a stochastic modeling of a use condition of the associated motor vehicle by an associated user of the vehicle over time.

20. The logic according to claim 15, further operable to:

selectively activate by the control logic operating in the first mode the power consuming device of the associated motor vehicle responsive to: i) determining a presence of a user of the associated motor vehicle within a predetermined proximity to the associated motor vehicle, and ii) determining a likelihood S that the associated motor vehicle will be keyed on each time the associated user enters into the predetermined proximity to the associated motor vehicle.

21. The logic according to claim 15, further operable to:

selectively activate by the control logic operating in the first mode the power consuming device of the associated motor vehicle responsive to: i) determining a presence of a user of the associated motor vehicle within a predetermined proximity to the associated motor vehicle, and ii) determining a rate of movement of the associated user above a predetermined threshold towards the associated motor vehicle.

* * * * *